United States Patent

[11] 3,597,096

[72] Inventor  Herbert Burkhard
         Eastchester, N.Y.
[21] Appl. No. 22,418
[22] Filed    Mar. 25, 1970
[45] Patented  Aug. 3, 1971
[73] Assignee  American Cynamid Company
         Stamford, Conn.

[54] A CELL FOR THE SPECTROSCOPIC EVALUATION OF SAMPLES INCLUDING A FRUSTRATED INTERNAL REFLECTION PLATE
16 Claims, 13 Drawing Figs.

[52] U.S. Cl. ................................................. 356/246
[51] Int. Cl. ................................................. G01n 1/10
[50] Field of Search ................................. 356/36, 51, 74, 24 L

[56] References Cited
UNITED STATES PATENTS
3,370,502  2/1968  Wilks ....................... 356/133

Primary Examiner—Ronald L. Wibert
Assistant Examiner—Orville B. Chew, II
Attorney—Lawrence W. Flynn ABSTRACT: An improved cell offering a variety of advantages is provided wherein a multiple internal reflection spectroscopy plate containing a thin layer of finely divided catalyst deposited on each surface is sealably mounted between two rigid heatable body members each of which contains a compartment therein which communicates with the catalyst deposited on the plate. Both compartments intercommunicate thereby providing pressure equilibration on each side of the cell. Reactants at the desired pressure and temperature are introduced into the compartments and envelop the catalyst layers. A portion of the spectroscopy plate protrudes from the cell and is bombarded with appropriate radiant energy such as an infrared beam. The beam enters the plate, is reflected through the plate and catalyst deposited thereon, and emerges from the plate with substantially all resultant absorption of the radiation attributable to phenomena occurring within the catalyst layer; this occurs because at no time is the beam exposed to the environment of reactants and reaction products in the compartments surrounding the catalyst or to other environments which produce substantial amounts of undesirable background absorption. Various embodiments of the above-described cell are disclosed.

Patented Aug. 3, 1971

INVENTOR.
HERBERT BURKHARD

BY Lawrence W. Flynn

ATTORNEY

Patented Aug. 3, 1971  3,597,096

INVENTOR.
HERBERT BURKHARD
BY Lawrence W. Flynn
ATTORNEY

FIG.11

Patented Aug. 3, 1971

INVENTOR.
HERBERT BURKHARD

BY Lawrence W. Flynn

ATTORNEY

A CELL FOR THE SPECTROSCOPIC EVALUATION OF SAMPLES INCLUDING A FRUSTRATED INTERNAL REFLECTION PLATE

BACKGROUND OF THE INVENTION

In catalysis, it is relatively simple to contact a known chemical compound or compounds with a catalyst under a given set of reaction conditions and produce a known chemical reaction product. What becomes difficult, however, is the pinpointing of the precise route by which such a transformation occurs. For example, a compound may undergo change into one or more species of varying stability before it finally emerges as the end product of the catalytic reaction. An intimate knowledge of the intermediate reactions involved is most desirable in many catalytic studies for purposes of accurately evaluating and comparing catalysts, as well as for the general development of catalytic theory.

A variety of techniques have been developed to obtain a better knowledge of the intermediate steps in a catalytic chemical reaction. One common procedure is to bombard the catalyst under study with suitable radiation such as, for example, infrared radiation. Useful information is obtained from the nature of the infrared absorption observed. In one such procedure, the catalyst under investigation is compressed into a pellet from its ordinary powdery and free flowing state; the catalyst pellet is inserted into a cell and subjected to a high temperature pretreatment step under vacuum to remove any surface impurities which could interfere with the investigation. The catalyst pellet is then exposed to reactants under the desired reaction conditions. However, the pellet cannot be conveniently irradiated at this point since it is surrounded by a gaseous environment of reaction products and unreacted reactants through which the radiation beam must pass and which, in most instances, produces such a substantial background absorption of the radiation as to render the gathering of meaningful data on the catalyst itself futile. A preferred practice, therefore, is to carry out the reaction for a prescribed time interval and then evacuate the environment of reactants and products surrounding the catalyst pellet as quickly as possible; the pellet is then irradiated. The problem with this technique is that because of equilibrium considerations, the state of the catalyst pellet at the time it is irradiated is almost certainly not the same as when it was surrounded by its true reactive environment of reactants and reaction products. Thus, the information obtained is of only limited use. A further disadvantage of the pelletizing technique is that once the catalyst is pelletized, the catalyst exists in a different physical state from the free flowing powdery form in which it will normally be used. Obviously, the rates of diffusion of products and reactants to and from reactive portions of the catalyst can be expected to vary from what might be observed with a nonpelletized, free flowing catalyst powder.

More sophisticated attempts to avoid the above problems have been made recently by employing the analytical tool of internal reflection spectroscopy. When internal reflection spectroscopy is used, there is no scattering of the radiation beam from particle to particle in the catalyst with the result that no energy is lost by such scattering. Moreover, techniques have been developed to eliminate pelletizing as described above and to study the catalyst in its natural state. In one such technique, catalyst is deposited as a thin powdery layer on one surface of an internal reflection spectroscopy plate. The surface is then exposed to reactants under prescribed conditions while the uncoated surface is ordinarily exposed to air at atmospheric pressure. If reaction conditions call for very low or very high pressure, it becomes apparent that a substantial pressure differential will exist across the plate; this can bend or crack the plate resulting, in either case, in destruction of the optical properties of the plate. A further disadvantage of this technique is that the irradiating beam must still pierce the environment surrounding the catalyst prior to contacting the catalyst thereby causing substantial undesirable background absorption due to the reactants and reaction products present in this environment.

To solve some of these problems, a cell has been proposed wherein a multiple reflection spectroscopy plate is coated on both sides with a thin layer of finely divided catalyst powder and wherein provision is made for equilibration of pressure on both sides of the plate. Reactants are then fed to the cell at the desired conditions. Such a system eliminates bending or cracking of the plate as a result of its pressure equilibration feature. However, in such systems, no provision is made for the irradiating beam to contact the catalyst directly; instead the beam typically enters the cell through a transparent plate made from a material such as sodium chloride; passage through this plate creates undesirable background absorption. The beam must then pass through the reactive environment surrounding the catalyst resulting in substantial additional undesirable background absorption due to the reactants and reaction products which the beam sees in this environment. The beam then enters the multiple reflection spectroscopy plate wherein the desired absorption occurs as a result of contact with the catalyst deposited on the plate. The beam exits the multiple reflection spectroscopy plate and again substantial undesirable background absorption occurs as it passes through the environment surrounding the catalyst and through a second sodium chloride window on its way out of the cell. The substantial amount of observed background absorption can obscure or mask the absorption attributable to the catalyst alone.

In view of the foregoing problems, it becomes apparent that there exists a need for an internal reflection spectroscopy cell suitable for studying catalytic behavior and other phenomena wherein the undesirable background absorption resulting from passage of an irradiating beam through cell windows and the reactive environment surrounding the catalyst are substantially eliminated. It is an object of this invention to provide such a cell.

SUMMARY OF THE INVENTION

This invention relates to an optical cell designed to provide meaningful internal reflection spectroscopy data when used over a wide range of pressures and temperatures. More particularly, the cell of this invention comprises a first rigid body member containing a conduit therein, a second rigid body member also containing a conduit therein, both of said conduits intercommunicating with one another to form a cell conduit system; this conduit system is connectable to tubing, piping, or such whereby fluids can be directed into said system. A multiple internal reflection spectroscopy plate is disposed between the two body members in such manner that the conduit of each body member communicates with a surface of the plate. The plate is sealably mounted between the body members by gaskets or other suitable sealing means to prevent leakage of fluid into or out of the conduit system of the cell at the plate. Each cell body members can be provided with means for heating the body member. The cell body members are clamped together against the internal reflection spectroscopy plate by bolts, or other suitable clamping means thereby effectively sealing the plate between the body members. At least a portion of the spectroscopy plate protrudes from the assembled cell to contact the surrounding environment; this permits direct entry of the radiation beam into the plate and emergence on the other side of the plate without its passing through the reactive environment present within the cell.

In operation, the multiple internal reflection spectroscopy plate is first coated with a fine layer of a catalyst or other material which is to be studied in accordance with known methods. The coated plate is inserted into the cell and the cell assembled for operation as described above. The cell is then heated to the desired temperature whereupon reactants are introduced into the conduit system of the cell at the desired pressure thereby providing a reaction system of catalyst and reactants in intimate contact at the desired conditions of temperature and pressure. Since the conduit system communicates with body sides of the spectroscopy plate, no pressure differential is created across the plate thereby providing for cell operation in the pressure range of from about $10^{18}$ torrs up to about 10 atmospheres. Moreover, since the catalyst material is not pelletized, but instead exists in its natural state, i.e. as a fine, free flowing powder, more meaningful data can be obtained with the cell of this invention. The reaction system is studied by directing into a protruding edge of the internal reflection spectroscopy plate, at the proper angle, a beam of suitable radiation such as, for example, infrared or ultraviolet radiation. The beam enters the plate at an angle and is reflected from one surface of the plate to the other as it passes through the entire length of the plate; as the beam passes through the plate, it also passes through the fine layer of catalyst which coats each surface of the plate resulting in a partial absorption of the radiation which is indicative of the reaction occurring in the catalyst itself. The beam then emerges from a protruding edge of the spectroscopy plate on the opposite side of the cell from which it entered. It should be noted that the radiation beam is never required to pass through the reactants surrounding the catalyst; this results in elimination of the substantial undesirable background absorption such a path would entail; instead the beam passes through the plate and catalyst only and therefore the absorption which does occur is indicative of only the reaction which occurring within the catalyst layer. This is in sharp contrast to various prior art cells wherein the beam must pass through the reactive environment present in the conduit systems of the cell both before and after it contacts the catalyst.

A host of modifications of the above-described basic cell are also contemplated within the scope of this invention. Several such embodiments are described in greater detail hereinbelow. For example, the cell can be readily equipped with a viewing plate assembly whereby the catalyst surface can be visually observed during the reaction. Moreover the conduit system can be capped to provide for studies under static conditions or it can be equipped at any convenient point with discharge means which provide for continual withdrawal of reactants and products from the cell after contact with the catalyst thereby making the cell eminently suitable for studying a dynamic reaction environment. In such cases there is a continual flow of reactants into and out of the cell with such reactants contacting the catalyst continually in their passage through the cell.

The cell is also eminently suitable for connection to a sample evacuation chamber which permits a catalyst sample to be deposited on one surface of the internal reflection spectroscopy plate without first being exposed to the atmosphere in the course of coating the plate and inserting it into the cell. In such an embodiment of this invention, the cell intercommunicates with a sample evaporation chamber which operates to deposit a fine layer of catalyst by vacuum deposition upon one surface of the internal reflection spectroscopy plate. Reactants are then fed to the cell to contact the catalyst providing for study of the catalyst reaction using an ultra pure, uncontaminated, virgin catalyst layer. These and other embodiments of the cell of this invention will be apparent from a total reading of this specification.

BRIEF DESCRIPTIONS OF THE DRAWINGS

FIG. 8 is a top partial sectional view of a still further embodiment of this invention.

FIG. 9 is a partial sectional view of a preferred embodiment of the cell of this invention used in conjunction with a sample evaporation chamber.

DESCRIPTION OF THE PREFERRED EMBODIMENTS

FIRST EMBODIMENT

Figure 1:
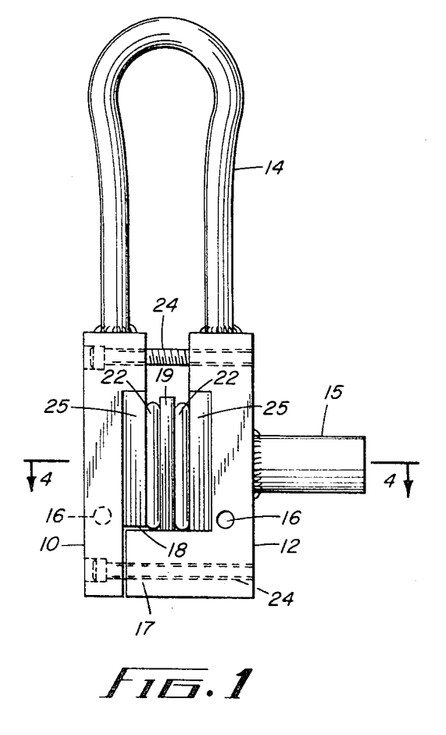
FIG. 1 is a side elevation view of an embodiment of the cell of this invention.
Figure 2:
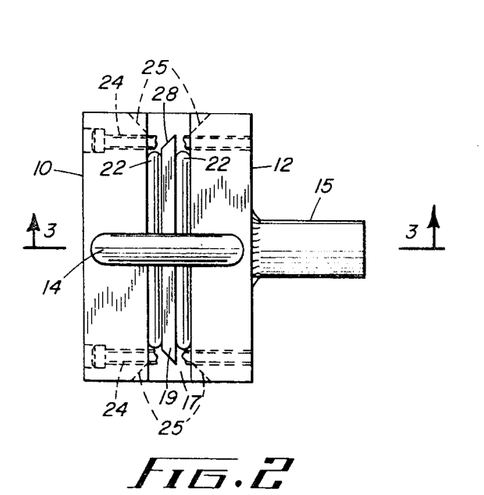
FIG. 2 is a top view of the cell of FIG. 1.
Figure 3:
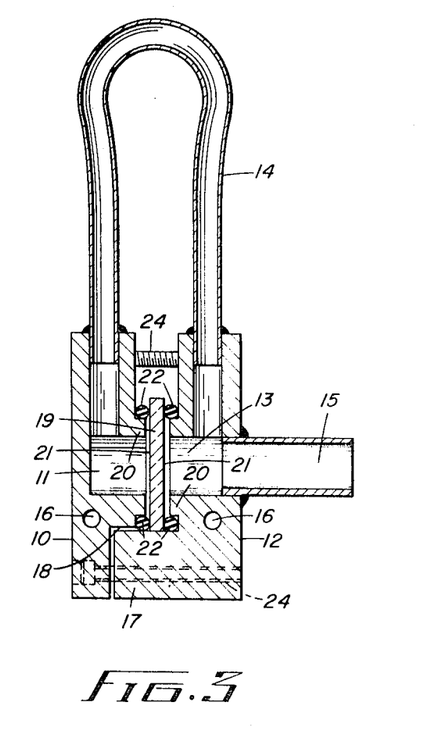
FIG. 3 is a sectional view taken along the line 3-3 of FIG. 2.

FIGS. 1 through 4 show a preferred embodiment of the cell of this invention which is best understood by reference to FIG. 3, a side sectional view of the cell. Referring to FIG. 3, it can be seen that the cell comprises a first rigid body member 10 containing therein a conduit 11 and a second rigid body member 12 also containing therein a conduit 13. Conduits 11 and 13 intercommunicate via conduit 14 thereby providing within the cell a conduit system comprising conduits 11, 13 and 14. This conduit system is connectable to tubing or other conventional fluid feed means (not shown) via leg 15 of conduit 13.

Body members 10 and 12 can be fabricated from any suitable rigid material; the material selected will, of course, depend not only upon the temperature and pressure at which the cell is to be operated, but also upon the nature of the reaction to be studied; for example, it would be most undesirable to have a subsidiary reaction occurring on the walls of the conduit system of the cell. Of course, such subsidiary reactions can be eliminated or minimized by coating the walls of the conduit system with attenuating materials such as silica and Teflon®, etc. It has been found that 314 stainless steel or 316 stainless steel is a good general material of construction for cell body members 10 and 12.

The cell can be raised to any desired temperature by cartridge heaters 16 which are inserted in members 10 and 12. Any suitable heating means would also be acceptable; for example, blocks 10 and 12 can be wound with a high-resistance heating wire or they can be heated by radiation.

Block 12 is provided with a shoulder 17 which is adapted to fit into the corresponding recess 18 of block 10. Shoulder 17 is dimensioned to provide an interspace between blocks 10 and 12 into which internal reflection spectroscopy plate 19 can be conveniently inserted. Plate 19 is a conventional multiple internal reflection spectroscopy plate and can be made from a variety of materials such as, for example, thallium bromide/thallium iodide (KRS-5), thallium bromide/thallium chloride (KRS-6), high purity silicon, high purity germanium, silver chloride, or sapphire. The plate material is ordinarily selected to insure transmission of the type of radiation being used. For example, whereas a thallium bromide/thallium iodide plate is suitable for infrared radiation, a sapphire plate would be used for visible or ultraviolet radiation. Typically, such plates have a refractive index ranging from about 1.0 to 4.0. A variety of such plates are described in the text "Internal Reflection Spectroscopy," N. Harrick, Wiley Pub. Co. (1964).

Body members 10 and 12 are each provided with a shoulder 20 in the region immediately adjacent the surfaces 21 of plate 19; conduits 11 and 13 pass through shoulder 20 of each body member to communicate with plate 19. Plate 19 is sealed within the cell by means of gaskets 22 (O-rings) which fit over the periphery of shoulders 20 and contact surfaces 21 of plate 19. The gasket materials are generally compressible elastic materials such Teflon , for example, rubber, Viton®, silicone rubber, neoprene rubber, butyl rubber, Teflon®, etc. or soft metals such as, for example, lead, gold, and copper. A variety of other gasket materials are, of course, also suitable.

The cell is assembled by depositing a fine layer 23 of catalyst (see FIG. 4) on each surface 21 of plate 19 using known techniques, inserting plate 19 between body members 10 and 12 and joining together body members 10 and 12 using setscrews 24 or other suitable clamping means. Screws 24 are tightened until gaskets 22 compress sufficiently to effectively prevent flow of fluids into or out of the conduit system of the cell at plate 19.

Body members 10 and 12 can each be optionally provided with a lateral angled cutout 25 (see FIGS. 1, 2 and 4) in the region of members 10 and 12 where the light beam enters the cell to contact the internal reflection spectroscopy plate 19. Cutout 25 is not an essential feature of the cell but is provided merely to allow convenient access of radiation beam 26 (see FIG. 4) to plate 19 at the required angle in instances where the external reflection mirrors such as that shown at 27 in FIG. 4 are mounted in close proximity to the cell; if mirrors 27 were mounted further away from the cell, cutouts 25 could be eliminated since the angle of radiation beam 26 into plate 19 would be adequate to strike plate 19 directly without the possibility of interference by portion of body members 10 or 12.

Figure 4:
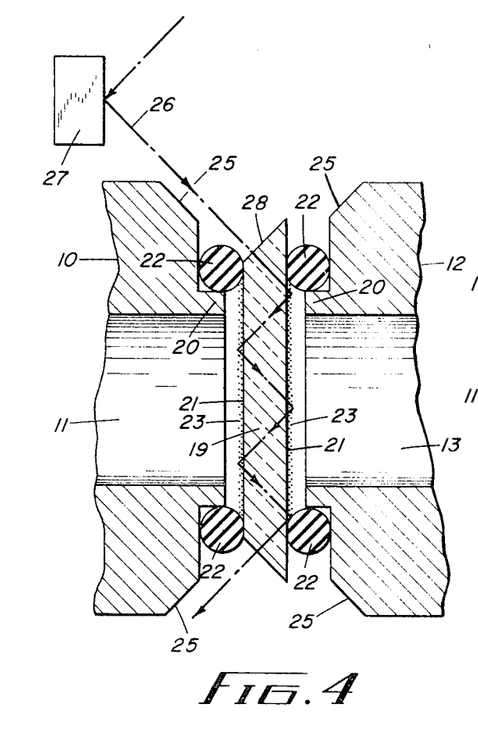
FIG. 4 is an enlarged sectional detail view taken along the line 4-4 of FIG. 1.

The actual operation of the cell is best understood by reference to FIG. 4. Referring to FIG. 4, it can be seen that plate 19 contains on each surface 21 thereof a thin layer 23 of finely divided catalyst. During operation of the cell, conduits 11 and 13 are filled with the reactants under study which will, of course, be in intimate contact with catalyst layer 23. Since conduit 11 is, in effect, capped by member 10, the reactants remain in contact with the catalyst to provide a static system. Once the requisite conditions of temperature and pressure have been established in the cell, a beam of infrared or other suitable radiation of external origin 26 is directed into the cell. The beam ordinarily first strikes a deflector mirror 27 whereupon it passes through cutout 25 and into plate 19. For the most efficient utilization of energy, beam 26 should strike the surface 28 of plate 19 which protrudes from the cell at an angle of 90°; this will reduce reflection losses and allow a larger portion of the radiation to pass through plate 19 by internal reflection.

Beam 26 enters plate 19 at protruding surface 28 and is internally reflected through plate 19 as shown schematically in FIG. 4; beam 26 emerges from plate 19 at the protruding edge of plate 19 on the opposite side of the cell from which it entered whereupon it is directed to appropriate recording equipment where the extent and nature of the energy absorption is determined. In the course of traveling through plate 19, beam 26 passes through catalyst layer 23 on both surfaces of plate 19 as shown in FIG. 4. As beam 26 passes through catalyst layer 23, substantially none of beam 26 is exposed to the reactive environment present in conduits 11 and 13 with the result that the only absorption which occurs is that resulting from phenomena within catalyst layer 23. No undesirable background absorption occurs because beam 26 never contacts the reactants present in conduits 11 and 13. This is in sharp contrast to prior internal reflection spectroscopy cells wherein the beam was required to pass through the reactants not only prior to contacting the spectroscopy plate but also after it emerged from the spectroscopy plate on its way out of the cell. It is apparent that the substantially complete elimination of contact between radiation beam 26 and reactive environment surrounding catalyst layer 23 is a distinct and unique advantage of the cell of this invention since this cell permits data to be gathered which reflects the behavior of the catalyst layer only, with substantially no interference whatsoever due to background absorption.

It can be seen that gaskets 22 contact the surfaces 21 of plate 19. As a result, some background absorption can arise from contact of beam 26 with gaskets 22 at the gasket-plate interface. This can occasionally present a problem if the resulting absorption is observed in a region which overlaps that wherein absorption due to the catalyst under study is also likely to occur. This problem is readily obviated by providing a radiation insulating means between gaskets 22 and surfaces 21 of plate 19 which will prevent beam 26 from contacting gaskets 22. A suitable insulating means is provided by virtually any metal such as, for example, gold, aluminum, platinum, rhodium, palladium, copper, indium, and such. Alloys of two or more metals, such as those mentioned above, are also quite suitable insulating vehicles.

Figure 5:
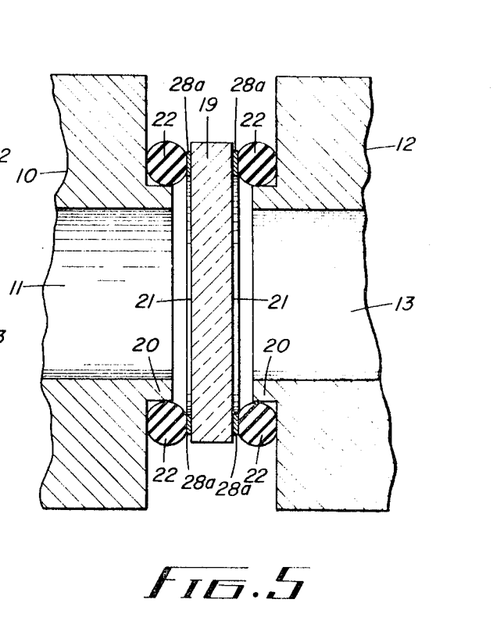
FIG. 5 is an enlarged sectional detail view taken along the line 3-3 of FIG. 2 and illustrates the inclusion of a metal insulating ring between the spectroscopy plate and the plate sealing gasket.

Gaskets 22 can be conveniently insulated from contact with surfaces 21 of plate 19 in several ways. An expedient way is to simply insert a piece of metal foil 28a of appropriate geometric configuration between gaskets 22 and surfaces 21 of plate 19 as shown in greater detail in the enlarged side sectional view of the cell shown in FIG. 5. Generally, it is not necessary to insulate the entire interface between gaskets 22 and plate 19 since beam 26 is ordinarily not of sufficiently large beam height to pass through more than a portion of plate 19; therefore only that portion of plate 19 through which beam 26 passes need be insulated from gaskets 22. This is best understood by reference to FIG. 6.

Foil thickness is not critical; thicknesses of 0.1 micron to one-sixteenth inch can be used with thinner thicknesses such as 0.1 to 0.5 microns being preferred.

Figure 6:
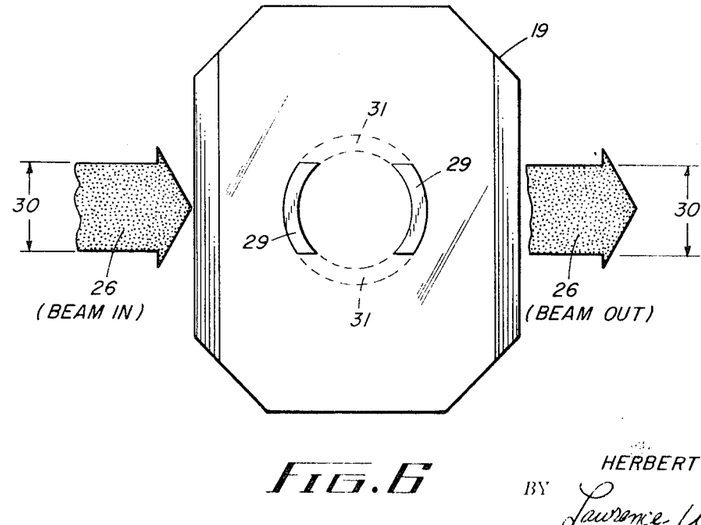
FIG. 6 is a front elevation view of an internal reflection spectroscopy plate containing a vacuum evaporated metal film on the surface thereof in the zone of radiation transmission.

Gaskets 22 are also conveniently insulated from contact with plate 19 by depositing on either plate 29 or that portion of the surface of gaskets 22 which contacts plate 19 a thin vacuum evaporated film of a metal such as those described above. Again, film thickness is not critical; thicknesses of 0.05 to 2 microns are suitable with thicknesses of one-half of 1 microns being preferred. Procedures for depositing such films onto either plate 19 or gaskets 22 are known and include such techniques as thermal evaporation, sputtering, and electron bombardment. FIG. 6 depicts a frontal view of a typical internal reflection spectroscopy plate 19 for use with the cell of FIGS. 1 to 4 which is coated with a metal film 29; plate 19 is metal coated only in the region of plate 19 through which beam 26 will pass (as determined by the height 30 of beam 26) and remains uncoated in the remaining portion 31 of its surface (dotted lines) which contacts gaskets 22.

The above remarks with reference to the occasional desirability of insulating gaskets 22 from plate 19 are of general applicability to all of the embodiments of in invention.

SECOND EMBODIMENT

Figure 7:
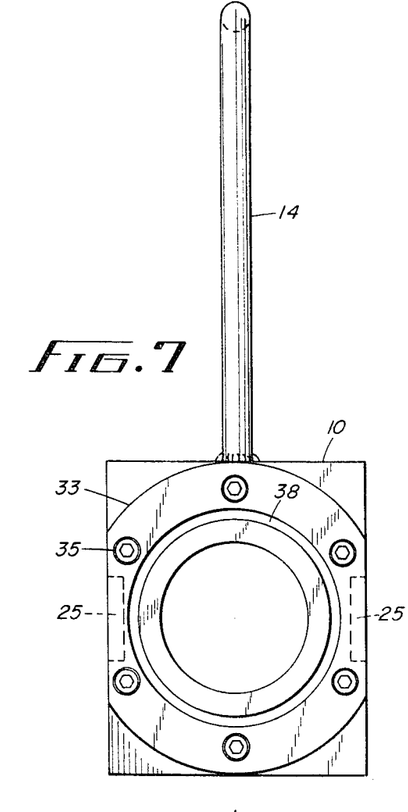
FIG. 7 is a front elevation view of another embodiment of a cell of this invention.
Figures 8, 10:
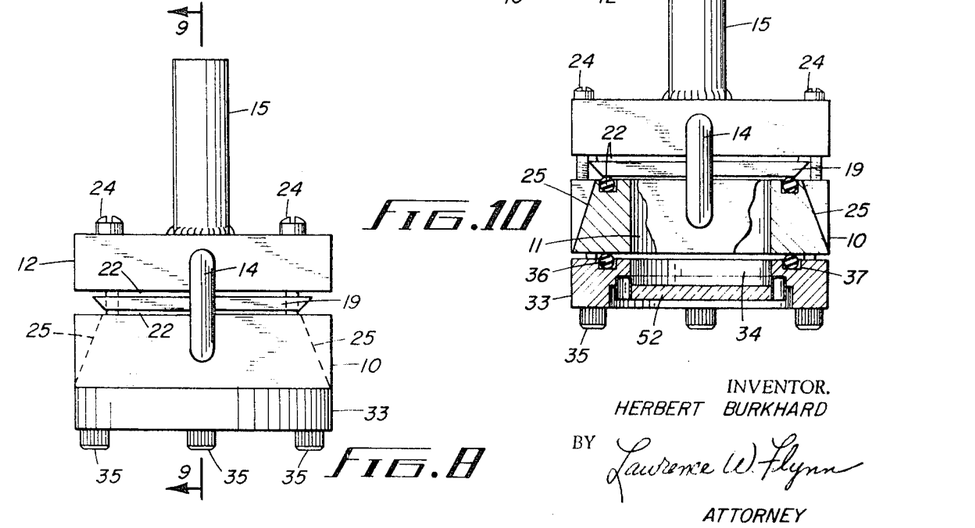
FIG. 8 is a top view of the cell of FIG. 7.
FIG. 10 is a side sectional view of another embodiment of the cell of this invention.
Figure 9:
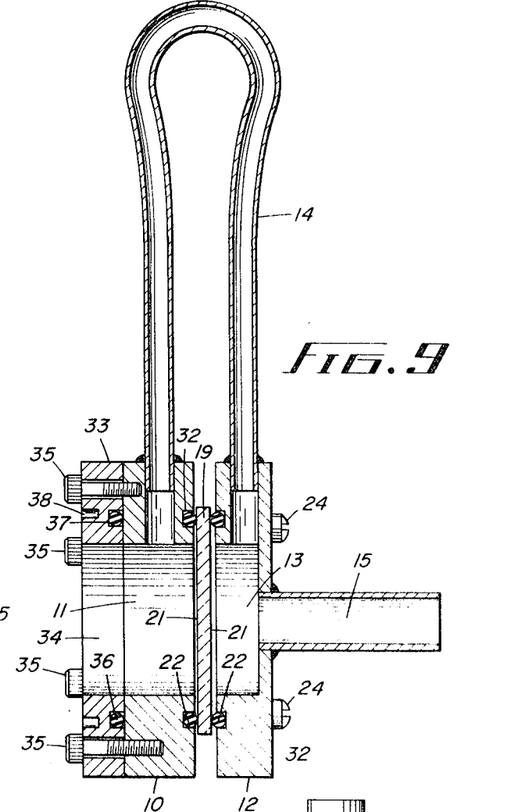
FIG. 9 is a sectional view taken along the line 9-9 of FIG. 8.

FIGS. 7 through 9 present another preferred embodiment of the cell of this invention. This cell is in most respects substantially identical to the cell shown in FIGS. 1 through 3 and in a areas where there is substantially similar structural similarity the numbering system of FIGS. 1 through 3 will be employed for purposes of clarity and to prevent needless repetition.

Figure 11:
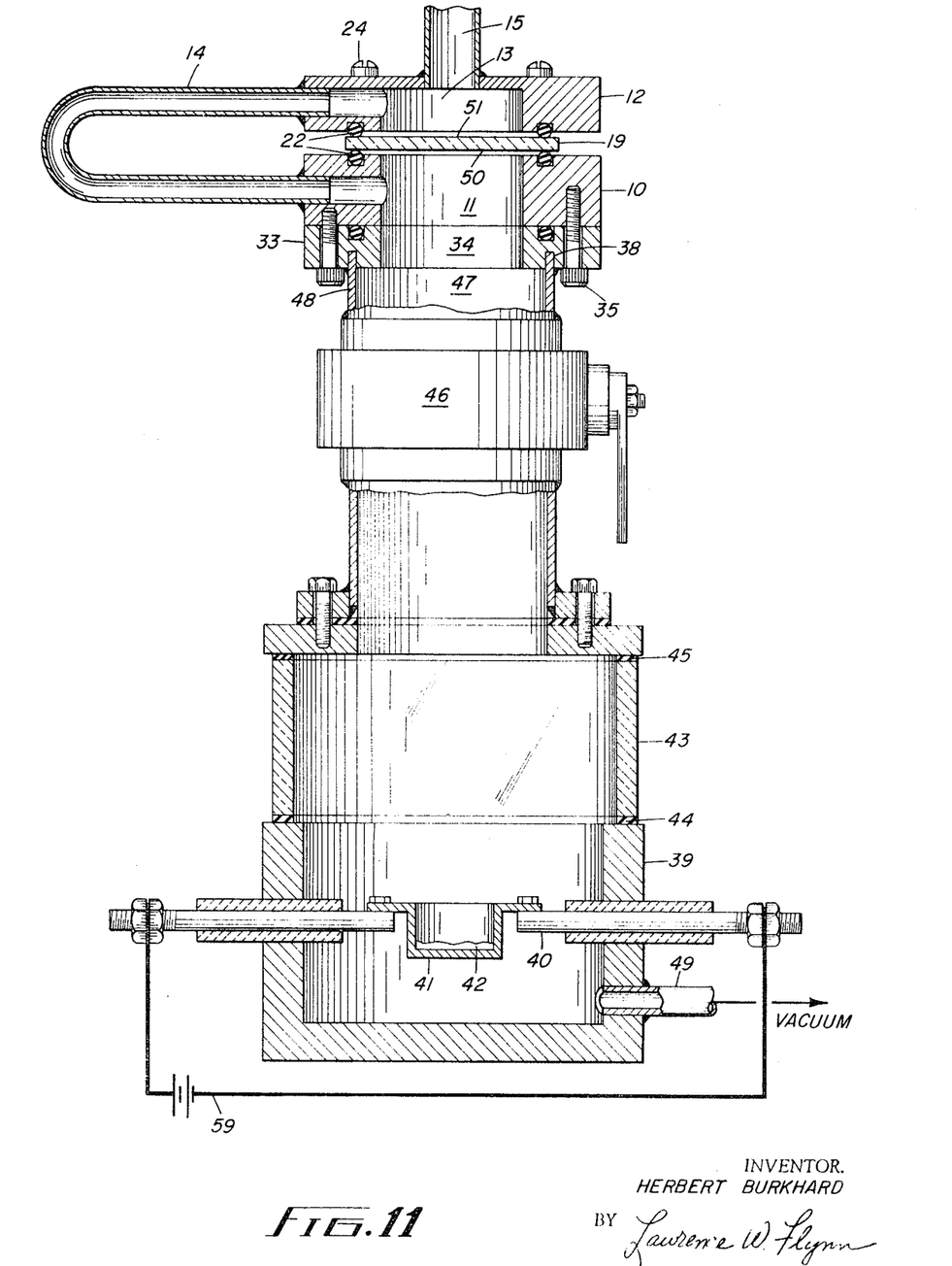
FIG. 11 is a top sectional view of still another embodiment of this invention.

This cell contains three major differences from that shown in FIGS. 1 through 3. The first difference is that in lieu of plate 19 being sealed within the cell by gaskets 22 inserted about the periphery of shoulder 19 of members 10 and 12, plate 19 is now sealed within the cell by gaskets 22 which are inserted into continuous circumferential groove 32 in the surface of body members 10 and 12. The second difference is that shoulder 17 of member 12 is completely removed, plate 19 being retained in the cell solely by the frictional forces exerted by gaskets 22. The third difference from the cell of FIGS. 1 through 3 is the affixation to the basic cell structure of member 33. Member 33 contains a conduit 34 which intercommunicate with conduit 11 of member 10 and therefore intercommunicates with the entire conduit system of the cell as heretofore described. Member 33 is attached to member 10 via screws 35 or other suitable clamping means. Member 33 is sealed against member 10 by means of a suitable compressible elastic gasket means 36 such as those described hereinabove which is inserted in groove 37 on the surface of member 33. The function of member 33 is to permit the cell assembly to be connected to a sample evacuation chamber such as that shown in greater detail in FIG. 11 by employing continuous groove 38 on the surface of member 33. Referring to FIG. 11, an airtight sample evaporation chamber 39 is provided containing therein means 40 for mounting a sample boat 41 within said chamber; means 42 are provided to pass a current through boat 41 to heat the sample 42 of catalyst material contained therein. Mounted atop chamber 39 is a transparent observation chamber 43 which is sealably mounted atop chamber 39 via compressible sealing gasket 44. Sealably mounted by compressible gasket 45 atop chamber 43 is conventional valve means 56, said valve means preferably comprising a standard gate valve. Valve means 46 communicates with the cell of this invention by conduit 47 the ends 48 of which are inserted into groove 38 on the surface of member 33; ends 48 are preferably connected to groove 38 by welding.

After the apparatus of FIG. 11 is assembled, conduit 13 is sealed to the surrounding environment and vacuum is applied to the entire apparatus via conduit 49 in chamber 39 to evacuate the entire apparatus shown in FIG. 11 and maintain an extremely low pressure therein. At this point, an electrical potential is applied across boat 41 which raises the temperature of sample 42 contained therein to a predetermined value whereupon a portion of sample 42 volatilizes and travels in a straight line through chambers 39 and 43, opened valve 46, conduit 47, conduit 34 and conduit 11, eventually depositing as a thin film on surface 50 of plate 19; since the catalyst vapor travels only in a straight line, none of it will be directed via conduit 14 to surface 51 of plate 19. Once a sufficient amount of catalyst has been deposited on surface 50 of plate 19, valve 46 is closed to sever the connection between evacuation chamber 39 and the cell itself. At this point, reactants are introduced through conduit 13 into the conduit system of the cell. These reactants then contact the catalyst deposited on surface 50 of plate 19; suitable radiation is then directed into plate 19 as heretofore described whereby the catalytic reaction can be studied. An advantage of the apparatus in FIG. 11 is that it permits the layer of catalyst deposited on surface 50 of plate 19 to be deposited in what can be termed a virgin state, since it has never been subjected to the atmosphere and all of the contaminants attendant with such exposure. It therefor permits study of the catalyst under almost ideal conditions and without undesirable results which can often appear when a catalyst has been subjected to the environment prior to study.

THIRD EMBODIMENT

FIG. 8 represents a modification of the cell shown in FIGS. 7 through 9 which permits the cell to be used by itself, i.e. not in conjunction with the sample evacuation chamber apparatus of FIG. 11. In this embodiment, member 33 is simply modified to provide means for blocking off conduit 11 from the surrounding environment. This caN be done in several ways. For example, member 33 can be modified to eliminate conduit 34 totally by simply converting member 33 into a solid plate attached to member 10 by screws 35 to, in effect, seal off conduit 11 from the surrounding environment. Similarly, and as shown in FIG. 8, a transparent viewing plate 52 can be sealably mounted using a Kovar glass-metal seal, for example, within member 33 across conduit 34 thereby not only blocking off conduit 11 from the surrounding environment, but also providing means for an operator to view the catalyst deposited on plate 19 during the gathering of experimental data since plate 34 will be in visual communication with plate 19 via conduits 34 and 11. Member 33 is sealably mounted against member 10 by means of compressible elastic gasket 36 which is inserted into continuous groove 37 on the surface of member 33. As screws 35 are tightened, gaskets 36 compress to effect a good seal.

Various other arrangements can be envisioned for blocking off conduit 11 to the environment. For example, if the surface of member 10 adjacent member 33 was modified to provide a continuous peripheral groove therein into which a compressible elastic gasket was inserted, a transparent viewing plate could be readily inserted between members 33 and 10; this plate would be sealed between the two members by the action of gaskets 37 and those in the surface groove of member 10 compressing against the viewing plate when screws 35 were tightened.

FOURTH EMBODIMENT

Figure 12:
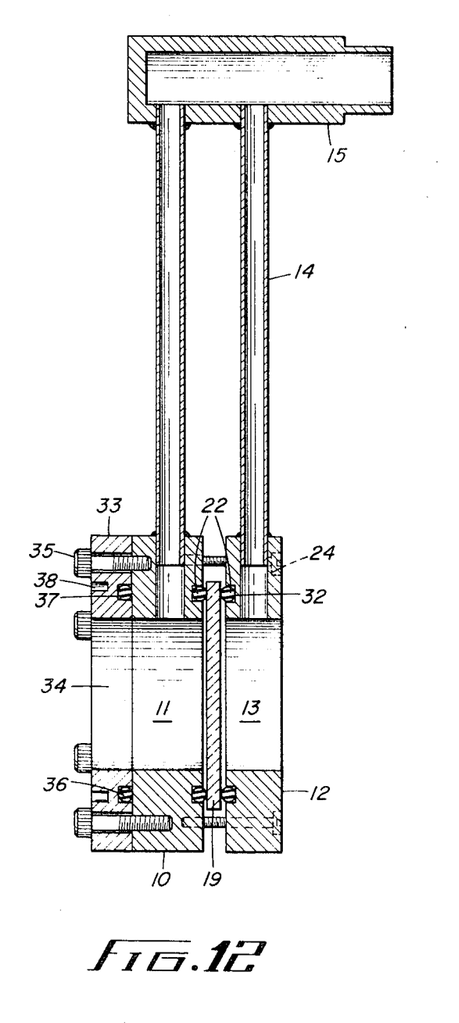
FIG. 12 is a side sectional view illustrating a modified embodiment.

Another embodiment of the cell of this invention is shown in FIG. 12. This embodiment is substantially similar to that shown in FIGS. 7 through 9 except that conduit 15 is eliminated and conduit 13 is extended to emerge at the surface of member 12. Conduit 15 which is the inlet of the reactants has been moved to now intercommunicate with conduit 14 so as to feed reactants to conduits 11 and 13. The cell of FIG. 12 can be used in conjunction with a sample evacuation chamber in substantially the same manner as described heretofore for the cell of FIGS. 7 through 9. Similarly, the cell of FIG. 12 can be used alone, i.e. not in conjunction with the sample evacuation chamber by simply capping both conduits 11 and 13 with viewing plates or blanks substantially as described above and in FIG. 10 for the cell of FIGS. 7 through 9.

Figure 13:
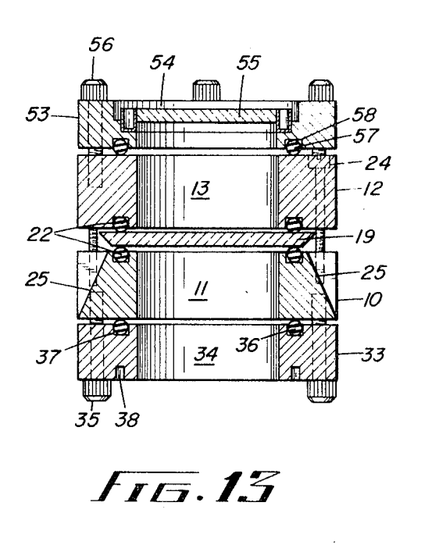
FIG. 13 is a top sectional view illustrating a modified embodiment.

An advantage of the cell of FIG. 9 is that when used in conjunction with the sample evacuation chamber, it can be equipped with a member 53, as shown in FIG 13, containing a conduit 54 which intercommunicates with conduit 13 of member 12 and therefore visually intercommunicates with the catalyst deposited on plate 19. Sealably mounted within conduit 54 is a transparent viewing plate 55. Member 53 is affixed to member 12 by screws 56 and is sealed against member 12 by the expansion of compressible elastic gasket 57 inserted in continuous groove 58 on the surface of member 53.

FIFTH EMBODIMENT

If it is desirable to study a dynamic system in the cell of this invention, this is readily and conveniently accomplished by providing means for discharging the inlet fluids from the cells after they have been brought into contact with the catalyst. This can be done by providing a discharge conduit which intercommunicates with the conduit system of the cell at a point which assures discharge of the inlet fluid from the cell but only after the inlet fluid has had an opportunity to contact the catalyst. For example, in the cell described in FIGS. 1 through 3, body member 10 can be modified to provide a discharge conduit which intercommunicates with conduit 11. In this way, a continuous flow of reactants can enter conduit 13 and pass via conduit 14 into conduit 11 whereupon it will then be discharged from the cell via the discharge conduit. When the cell is operated in this manner, both layers of catalyst on plate 19 will be subjected continuously to a flow of the desired reactants thereby allowing the catalyst to be studied in substantially its natural state under dynamic reactive conditions. Similar discharge means will be apparent for the various other embodiments of the cell of this invention.

I claim:
1. An optical cell comprising:
 1. a first body member containing a conduit therein;
 2. a second body member containing a conduit therein, said conduit intercommunicating with the conduit of said first body member to form a conduit system with the cell, said conduit system being connectable to tubing means;
 3. a multiple internal reflection spectroscopy plate disposed between said body members, the conduits of each of said body member communicating with said plate, said plate having at least a portion thereof exposed to the surrounding environment whereby radiation can be introduced directly into said plate from said environment;
4. sealing means disposed between each body member and said plate for sealing said plate between said body members whereby passage of fluid out of or into said conduit system is effectively prevented; and
5. means for compressing each of said body members against said sealing means thereby effectively sealing said plate between said body members.

2. The cell of claim 1 wherein each of said body member further includes means for heating said body member.

3. The cell of claim 1 wherein each of said body members contains a shoulder through which said body member conduit flows in that area of said member adjacent the surface of said spectroscopy plate, and wherein said sealing means is a gasket of a compressible elastic material which envelopes the periphery of said shoulder.

4. The cell of claim 1 wherein said sealing means comprises a continuous groove on that surface of each body member which is adjacent the spectroscopy plate and a gasket of a compressible elastic material which rests within said groove.

5. The cell of claim 3 wherein one of said body members contains a second shoulder and wherein the other body member is recessed to receive said second shoulder, said shoulder being dimensioned to provide a space between said members after the members are joined together by said clamping means wherein said spectroscopy plate can be sealably positioned.

6. The cell of claim 1 wherein said conduit system contains fluid discharge means whereby the contents of said conduit system are removable from said system.

7. The cell of claim 1 wherein at least one of said body members contains, in the region adjacent to the portion of the internal reflection spectroscopy plate exposed to the environment, a cutout to provide access of said beam to said plate.

8. The cell of claim 1 further including
a. a fluid impervious plate adjacent to at least one of said body members, said plate communicating with the conduit of said adjacent body member to cap said conduit;
b. means for affixing said plate to said adjacent body member; and
c. sealing means disposed between said plate and said adjacent body member for sealing said plate against said adjacent body member.

9. The cell of claim 8 wherein at least one of said plates as defined in (a) is transparent and TRANSPARENT wherein the conduit of said body members provides visual communication between said multiple internal reflection spectroscopy plate and said transparent plate.

10. The cell of claim 8 wherein said plate as defined in (a) is transparent and is adjacent only one of said body members and wherein the conduit of said body member provides visual communication between said internal reflection spectroscopy plate and said transparent plate.

11. The cell of claim 1 further including
a. a third member containing a conduit therein, said member positioned adjacent one of said body members, one end of said conduit intercommunicating with the conduit of said body member and the other end connectable to tubing means;
b. means for affixing said member to its adjacent body member;
c. sealing means disposed between said third member and said adjacent body members for providing a seal between said member and its adjacent body member;

12. The cell of claim 11 further including
a. a sample evaporation chamber;
b. tubing means intercommunicating with said chamber and said conduit of said third member;
c. valve means disposed between said chamber and said third member;

13. The cell of claim 12 wherein said sealing means comprises a continuous groove in that surface of said third member which is adjacent the body member and a compressible elastic gasket resting within said groove.

14. The cell of claim 10 further including
a. a third member containing a conduit therein, said member positioned adjacent that body member not in communication with said transparent plate, one end of said conduit communicating with the conduit of said adjacent body member and the other end connectable to tubing means.

15. The cell of claim 14 further including
a. a sample evaporation chamber;
b. tubing means intercommunicating with said chamber and said conduit of said third member;
c. valve means dispose between said chamber and said third member.

16. The cell of claim 15 wherein sealing means comprises a continuous groove in that surface of said third member which is adjacent the body member and a compressible elastic gasket within said groove.

UNITED STATES PATENT OFFICE
CERTIFICATE OF CORRECTION

Patent No. 3,597,096                    Dated August 3, 1971

Inventor(s) HERBERT BURKHARD

It is certified that error appears in the above-identified patent and that said Letters Patent are hereby corrected as shown below:

Column 3, line 3, cancel "body" and substitute -- both -- .

Column 3, line 5, cancel "$10^{18}$" and substitute -- $10^{-8}$ -- .

Column 3, line 28, insert the word "is" after the word "which".

Column 5, line 8, cancel "Teflon" and substitute -- as -- .

Column 6, line 34, cancel "29" and substitute -- 19 -- .

Column 6, line 38, cancel "one-half of 1" and substitute -- one-half to 1 -- .

Column 6, line 74, cancel "intercommunicate" and substitute -- intercommunicates -- .

Column 7, line 19, cancel "56" and substitute -- 46 -- .

Column 7, line 62, cancel "caN" and substitute -- can -- .

Column 9, line 47, delete the word "TRANSPARENT", second occurrence.

Column 10, line 41, cancel "dispose" and substitute -- disposed -- .

Signed and sealed this 25th day of January 1972.

(SEAL)
Attest:

EDWARD M. FLETCHER, JR.　　　　　　ROBERT GOTTSCHALK
Attesting Officer　　　　　　　　　　Commissioner of Patents